Oct. 4, 1955   W. C. BENNETT   2,719,377
FISHING LURE
Filed May 1, 1951

INVENTOR.
WALTER C. BENNETT
BY
McMorrow, Berman + Davidson
ATTORNEYS

United States Patent Office 2,719,377
Patented Oct. 4, 1955

2,719,377

FISHING LURE

Walter C. Bennett, Newark, N. Y.

Application May 1, 1951, Serial No. 223,849

2 Claims. (Cl. 43—42.27)

This invention relates to fish lures, and more particularly to a fly-type lure for casting.

It is among the objects of the invention to provide an improved fly-type lure in the form of a large insect, such as a dragonfly, which is capable of scaling or gliding when cast, to closely simulate the insect it resembles; which is so balanced that its flight can be readily controlled by the person making the cast; which is highly buoyant yet is of sufficient weight to facilitate accurate casting; and which is simple and durable in construction, economical to manufacture and neat and attractive in appearance.

Other objects and advantages will become apparent from a consideration of the following description and the appended claims in conjunction with the accompanying drawing, wherein:

Figure 1:
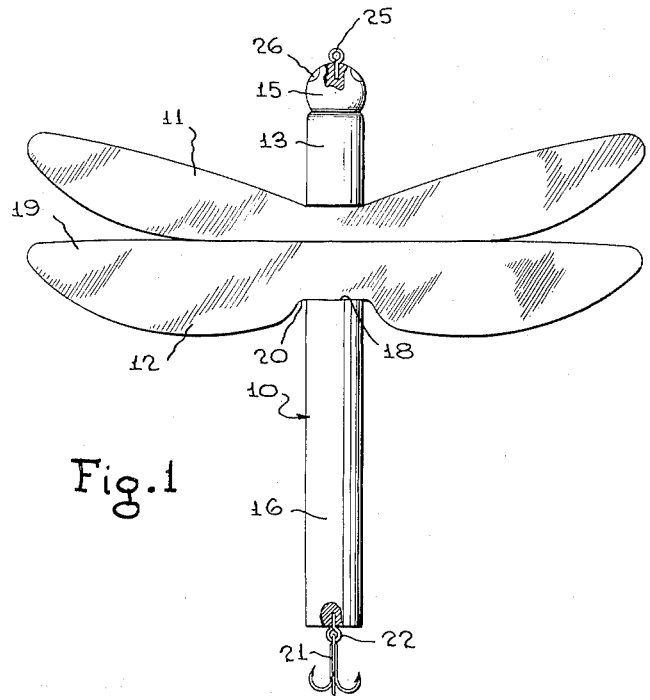
Figure 1 is a top plan view of a lure illustrative of the invention.

With continued reference to the drawing, the lure comprises an elongated body 10 formed of a buoyant material, such as wood, and wings 11 and 12 formed of thin and preferably transparent sheet material of high structural strength, such as isinglass or synthetic resin plastic.

Figure 3:
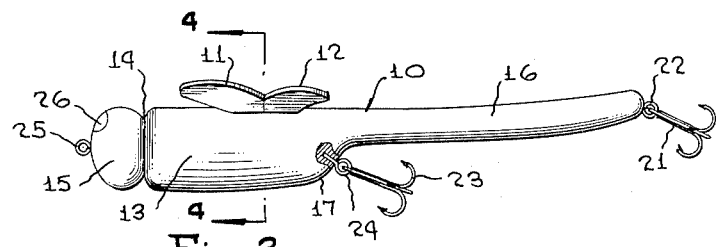
Figure 3 is a side elevational view of the lure.
Figure 4:
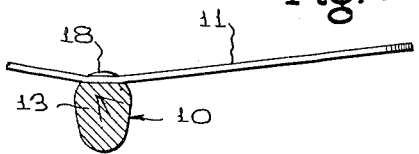
Figure 4 is a transverse cross-sectional view on the line 4—4 of Figure 3.

The body 10, as particularly illustrated in Figure 3, has a forward portion 13 of rounded or ovoid cross-sectional shape provided near its front end with an annular groove 14 to provide at the front end of the lure a rounded head formation 15, and a tail portion 16 having a length substantially the same as the length of the front portion 13 including the head formation 15. The top surface of the body is substantially continuous and somewhat concavely curved so that the distal end of the tail portion is inclined slightly upwardly. The front and tail portions have substantially the same width, the front portion having a thickness from its top to its bottom sides materially greater than its width, the tail portion having a thickness or depth materially less than that of the front portion. The front portion has a rounded rear end 17 at the lower side of the body.

Near its rear end the front portion 13 of the body is provided in its upper or top side with a rectangular notch 18 which receives the intermediate portions of the wings 11 and 12 and the wings are secured substantially at their mid-length location to the lure body at the upper side of the front portion of the body and have a length substantially as great as the length of said body. The rear wing 12 has a substantially straight front edge 19, and has a notch 20 in its rear edge disposed substantially symmetrically of the transverse center line of the wing. The rear edge of this wing is convexly curved from the opposite sides of the notch 20 to the respectively opposite end of the wing.

The front wing 11 has a straight rear edge extending along the straight front edge of the rear wing for a portion of the length of the front edge of the rear wing, and at the opposite ends of this straight rear edge is convexly curved in a forward direction to the respectively opposite ends thereof. The front edge of the front wing is also convexly curved at the opposite sides of the mid-length location thereof, and both portions of the front edge of the front wing at the respectively opposite sides of the lure body are inclined rearwardly from the corresponding ends of this wing, the end portions of this front wing being inclined forwardly, as a whole, from the straight front edge of the rear wing. The front and rear wings 11 and 12 may be made separately or may be integrally joined along the contiguous straight portions of the front edge of the rear wing and the rear edge of the front wing, if desired.

Figure 2:
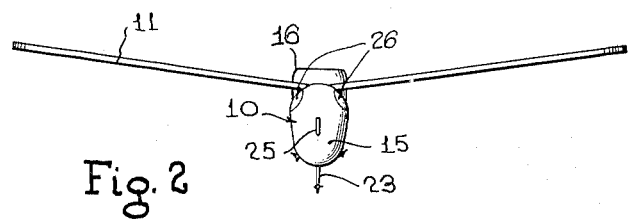
Figure 2 is a front elevational view of the lure.

The portions of both wings at the opposite sides of the lure body are inclined at a slight angle to a plane touching the tip ends of both wings, this inclination being upwardly in a direction away from the lure body, to provide between the wing portions a dihedral angle, as particularly illustrated in Figure 2, so that the lure will scale or glide and will have stability in flights, and the upwardly curved rear end of the flat tail portion 16 serves as a tail to maintain the lure substantially level in flight during the cast.

A small hook, preferably a triple hook, 21 is pivotally secured to the rear end of the tail portion of the body 20 by a screw eye 22 and a similar hook 23 is secured to the rear end of the front portion 13 of the body at the under side of the tail portion 16 by a screw eye 24. A line attaching screw eye 25 is secured in the front end of the body, and the lure body is preferably painted or decorated to closely simulate the coloring and marking of the insect which it is designed to simulate, such decoration including simulated eyes 26 on the upper front surface of the head portion 15.

As explained above, the entire lure is formed from light-weight material, and the wings 11 and 12 have sufficient area to support the lure in gliding flight so that it can be made to glide very close to the surface of the water, will float on the water and can be brought into flight from the water by jerking the line to which it is attached. This lure has been found extremely attractive to certain game fish, such as bass and pike, and to also provide an extremely interesting casting operation, since it can be made to perform in a satisfactory manner with only a moderate degree of skill on the part of the person making the cast, its performance naturally improving with increase in skill.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalence of the claims are, therefore, intended to be embraced therein.

What is claimed is:

1. In a fishing lure, an elongated buoyant body comprising a body portion having a rounded head formation on the front end, said body portion having a relatively straight top, and a tail portion substantially of the same width as the body portion and having a top portion aligned with the top of the body portion, said tail portion having an underside upwardly offset relative to the underside of the body portion, said body portion having a rear end portion terminating in a rounded end merging abruptly into the underside of the tail portion, and a forward end, first hook means pivotally connected to said rounded end, and second hook means pivotally connected to the end of the tail portion remote from the body portion, line attaching means on the rounded head formation of the body portion, and wing means secured to and extending crosswise of said body portion.

2. In a fishing lure, an elongated buoyant body comprising a body portion having a rounded head formation on the front end, said body portion having a relatively straight top, and a tail portion substantially of the same width as the body portion and having a top portion aligned with the top of the body portion, said tail portion having an underside upwardly offset relative to the underside of the body portion, said body portion having a rear end portion terminating in a rounded end merging abruptly into the underside of the tail portion, and a forward end, first hook means pivotally connected to said rounded end, and second hook means pivotally connected to the end of the tail portion remote from the body portion, line attaching means on the rounded head formation of the body portion, and wing means secured to and extending crosswise of said body portion, said wing means being spaced as a whole at a relatively great distance from the forward end of said body portion, and the top of the tail portion being curved upwardly toward the remote end of the tail portion.

References Cited in the file of this patent

UNITED STATES PATENTS

| | | |
|---|---|---|
| D. 126,221 | Hutcheson | Apr. 1, 1941 |
| D. 144,071 | Richards | Mar. 5, 1946 |
| 1,177,281 | Schweickert | Mar. 28, 1916 |
| 1,309,061 | Cassedy | July 8, 1919 |
| 1,785,310 | Johnson | Dec. 16, 1930 |
| 1,865,360 | Eger | June 28, 1932 |
| 2,140,821 | Tyrrell | Dec. 20, 1938 |
| 2,216,688 | Harvey | Oct. 1, 1940 |
| 2,236,241 | Wolfe | Mar. 25, 1941 |